US011707802B2

(12) United States Patent
Li et al.

(10) Patent No.: US 11,707,802 B2
(45) Date of Patent: Jul. 25, 2023

(54) METHOD OF FORMING A SINGLE, ANGLED AND HOURGLASS SHAPED WELD

(71) Applicant: GM Global Technology Operations LLC, Detroit, MI (US)

(72) Inventors: Huaxin Li, Rochester Hills, MI (US); Liang Wang, Rochester Hills, MI (US); Stephen R. McKenny, Ann Arbor, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 356 days.

(21) Appl. No.: 16/860,702

(22) Filed: Apr. 28, 2020

(65) Prior Publication Data
US 2021/0331272 A1 Oct. 28, 2021

(51) Int. Cl.
*B23K 26/035* (2014.01)
*B23K 26/24* (2014.01)
*B23K 26/06* (2014.01)
*B23K 26/062* (2014.01)
*B23K 26/08* (2014.01)
(Continued)

(52) U.S. Cl.
CPC .......... *B23K 26/035* (2015.10); *B23K 26/062* (2015.10); *B23K 26/0665* (2013.01); *B23K 26/08* (2013.01); *B23K 26/123* (2013.01); *B23K 26/60* (2015.10); *B23K 2101/008* (2018.08); *B23K 2103/04* (2018.08); *H05B 6/10* (2013.01)

(58) Field of Classification Search
CPC ............... B23K 26/062; B23K 26/035; B23K 26/0665; B23K 26/08; B23K 26/24; B23K 26/242; B23K 26/22
See application file for complete search history.

(56) References Cited

U.S. PATENT DOCUMENTS

| 6,410,882 B1 * | 6/2002 | Okada ................ B23K 26/0665 |
| | | 219/121.64 |
| 2010/0206855 A1 * | 8/2010 | Mokadem ............ B23K 35/007 |
| | | 219/121.64 |

(Continued)

FOREIGN PATENT DOCUMENTS

| CN | 101073857 A | 11/2007 |
| CN | 104002051 A | 8/2014 |

(Continued)

OTHER PUBLICATIONS

Machine translation of WO-2009021716-A1, Nov. 2022.*
(Continued)

*Primary Examiner* — Geoffrey S Evans
(74) *Attorney, Agent, or Firm* — Vivacqua Crane, PLLC (57) ABSTRACT

Angled, single laser weld and a method of forming an angled, single laser weld including arranging a first and second faying surfaces of a first and second component adjacently to form an interface between the components; irradiating at least one of the first and second components at the interface with a laser, wherein the first faying surface defines a plane formed at an angle alpha in the range of +/−5 degrees to 60 degrees from an axis A perpendicular to the first front surface and the second faying surface matches the first faying surface; and forming a junction at the interface with an hourglass shaped weld.

20 Claims, 6 Drawing Sheets

(51) Int. Cl.
*B23K 26/60* (2014.01)
*B23K 26/12* (2014.01)
*H05B 6/10* (2006.01)
*B23K 103/04* (2006.01)
*B23K 101/00* (2006.01)

(56) References Cited

U.S. PATENT DOCUMENTS

| | | | |
|---|---|---|---|
| 2011/0023990 A1* | 2/2011 | Yano | B23K 26/262 |
| | | | 219/121.64 |
| 2011/0097598 A1* | 4/2011 | McNutt | B23K 26/0626 |
| | | | 428/650 |
| 2013/0299469 A1* | 11/2013 | Uchida | B23K 26/28 |
| | | | 219/121.64 |
| 2018/0043472 A1* | 2/2018 | Yang | B23K 26/322 |
| 2018/0193951 A1* | 7/2018 | Miyagi | B23K 26/28 |

FOREIGN PATENT DOCUMENTS

| | | | | |
|---|---|---|---|---|
| CN | 104334349 A | * | 2/2015 | ........... B23K 1/0008 |
| CN | 103978309 A | | 11/2015 | |
| JP | 06210479 A | * | 8/1994 | |
| WO | WO-2009021716 A1 | * | 2/2009 | ........... B23K 26/082 |

OTHER PUBLICATIONS

Machine translation of CN-104334349-A, Nov. 2022.*
First Office Action in Corresponding Chinese App. No. 202110339377X, China National Intellectual Property Administration, dated Dec. 2, 2022.
Lei Shizhan et al., Laser Intelligent Manufacturing Technology, pp. 160-161, Fudan University Press, Jun. 2018.

* cited by examiner

FIG. 9

METHOD OF FORMING A SINGLE, ANGLED AND HOURGLASS SHAPED WELD

Laser welding is a method of fabrication that can be used to join two or more components together into a fused part. Generally, the starting components are formed from materials that melt upon exposure to heat, such as metals or thermoplastics. During the welding process heat is applied with a laser to melt the components at the faying surfaces, forming a melt pool between the faying surfaces that, upon cooling, solidifies to fuse the components together and into a part.

From time to time, single welds exhibit blowouts or form weld root notches. Depending on the severity, these defects may lead to stresses and weakness in the weld joint and rejection of the part. To reduce these defects, double welds are used in some applications, wherein a weld is applied at both ends of the faying surfaces. In doing so, the weld roots for each weld may meet and, in some cases, overlap between the joint surfaces.

Portions of the components adjacent to the faying surfaces are heated during laser welding. In these heat-affected zones temperature gradients develop as the part is heated and cools, which may alter the microstructure of the individual components and lead to the formation of residual stresses in the fused component. The alteration in microstructure and residual stresses may negatively impact the material properties of the fused components and, in some cases, may lead to cracking of either the weld or in the heat affected zone (HAZ) adjacent to the weld. More heat cycles, such as when double welds are applied, may further increase microstructure disruption and stresses, increasing the incidence of cracking or other forms of part failure.

Thus, while current laser welding processes achieve their intended purpose, there is a need for a new and improved system and process for providing fused components.

SUMMARY

According to several aspects of the present disclosure, a method of welding components includes arranging a first faying surface of a first component and a second faying surface of a second component adjacently to define an interface between the first component and the second component, wherein the first component includes a first front surface and a first back surface opposing the first front surface, and the second component includes a second front surface and a second back surface opposing the second front surface; irradiating at least one of a) the first front surface of the first component and b) the second front surface of the second component at the interface with a laser, wherein the first faying surface defines a plane formed at an angle alpha in the range of +/−5 degrees to 60 degrees from an axis A perpendicular to the first front surface and the second faying surface matches the first faying surface; melting the first faying surface and second faying surface and forming a melt pool at the interface; and forming a junction at the interface with an hourglass shaped weld.

In further aspects of the present disclosure, the laser defines a center axis and the center axis of the laser deviates from the plane defined by the first faying surface at an angle beta in the range of +/−0.1 to 5 degrees.

In additional aspects of the present disclosure, the method further includes adjusting a carbon equivalent of the hourglass shaped weld by adjusting an incident angle of laser as defined by a center axis of the laser.

In further aspects of the present disclosure, the first component exhibits a first ideal diameter and the second component exhibits a second ideal diameter, wherein the first ideal diameter is smaller than the second ideal diameter.

In further aspects of the present disclosure, the center axis defined by the laser is tilted at an angle in the range of 5 to 35 degrees from the axis perpendicular to the first component.

In additional aspects of the present disclosure, the method further includes focusing the laser at a focal point between the first front surface and the first back surface at a distance in the range of 35 percent to 65 percent of a thickness of the first component, wherein the thickness is measured perpendicular to the first front surface.

In additional aspects of the present disclosure, the method further includes operating the laser at a spot size in the range of 200 to 600 micrometers.

In further aspects of the present disclosure, the laser further comprises a center axis and further comprising offsetting the center axis from the interface and towards the first component at a distance in the range of 0.05 mm to 0.8 mm.

In additional aspects of the present disclosure, the method further includes operating the laser at a power in the range of 2 kW to 6 kW.

In additional aspects of the present disclosure, the method further includes operating the laser at a weld speed in the range of 1.00 meters per minute to 3.00 meters per minute.

In additional aspects of the present disclosure, the method further includes preheating the interface at the first back surface and the second back surface to a temperature in the range of 100° C. to 180° C.

In further aspects of the present disclosure, preheating is by at least one of the following: induction heating and heating with a defocused laser.

In additional aspects of the present disclosure, the method further includes defining a notch in at least one of the a) first back surface and the first faying surface and b) the second back surface and the second faying surface and a portion of the melt pool flows into the notch.

In additional aspects of the present disclosure, the method further includes applying an inert gas at the interface of the first back surface and the second back surface.

In additional aspects of the present disclosure, the method further includes forming only one hourglass shaped weld at the junction.

In additional aspects of the present disclosure, the method further includes forming the hourglass shaped weld to exhibit a weld surface length to weld midpoint length ratio in the range of 1:1 to 2.0:1.

In additional aspects of the present disclosure, the method further includes forming the hourglass shaped weld to exhibit a weld root length to weld midpoint length ratio in the range of 1:1 to 2.0:1.

In further aspects of the present disclosure, the first component is a circular gear and defines a center axis and the angle alpha of the plane deviates +/−10 to 30 degrees from the center axis.

According to several aspects of the present disclosure, a welded part includes a first component and a second component fused together at a junction; and an hourglass shaped weld formed at the junction, wherein the hourglass shaped weld defines a plane that is at an angle gamma in the range of +/−5 degrees to 60 degrees from an axis perpendicular to a first front surface of the first component and wherein the hourglass shaped weld exhibits a surface length to midpoint length ratio in the range of 1 to 2.0:1 and the hourglass shaped weld exhibits a root length to midpoint length ratio in the range of 1 to 2.0:1.

In additional aspects of the present disclosure, the first component includes a gear and the second component includes a flange.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
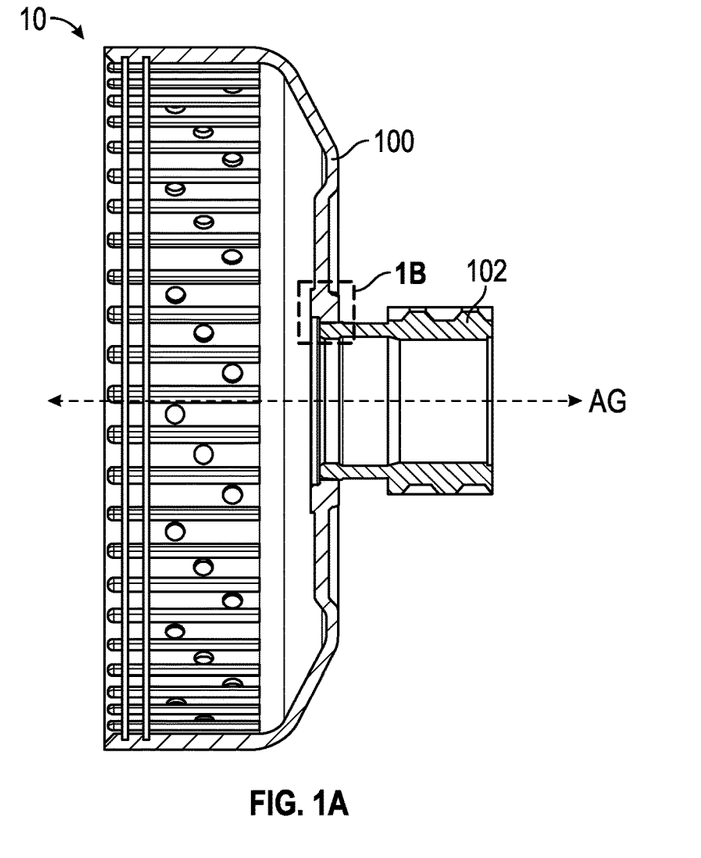
FIG. 1a is a cross-section of a transmission gear formed according to an exemplary embodiment.
Figure 1B:
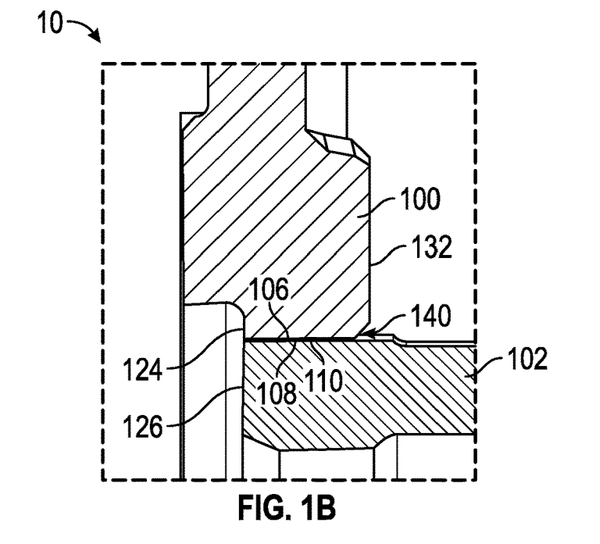
FIG. 1b is a close-up a portion of the cross-section of FIG. 1a illustrating two components arranged adjacently prior to laser welding according to an exemplary embodiment.

The present disclosure is directed to a method of forming a single, angled and hourglass shaped weld and components including an angled hourglass shaped weld. FIGS. 1a and 1b illustrate a cross-section of two components 100, 102. In this aspect the first component 100 is a circular flange and the second component 102 is a gear, which together form a part 10. In the illustrated aspect, the part is a transmission gear. The first component 100 is laser welded to the second component 102. It is to be appreciated that other components may be joined in accordance with the method described herein to form other parts.

By way of example, FIG. 1b illustrates a close-up of the first component 100 and second component 102 prior to welding. Each component includes a faying surface 106, 108. The faying surfaces 106, 108 are arranged adjacent to each other to form an interface 110 between the two components 100, 102 prior to welding. A faying surface may be understood herein as a surface that forms a junction 112. A junction may be understood herein as a point where two or more components are joined together to form a part.

Figure 2:
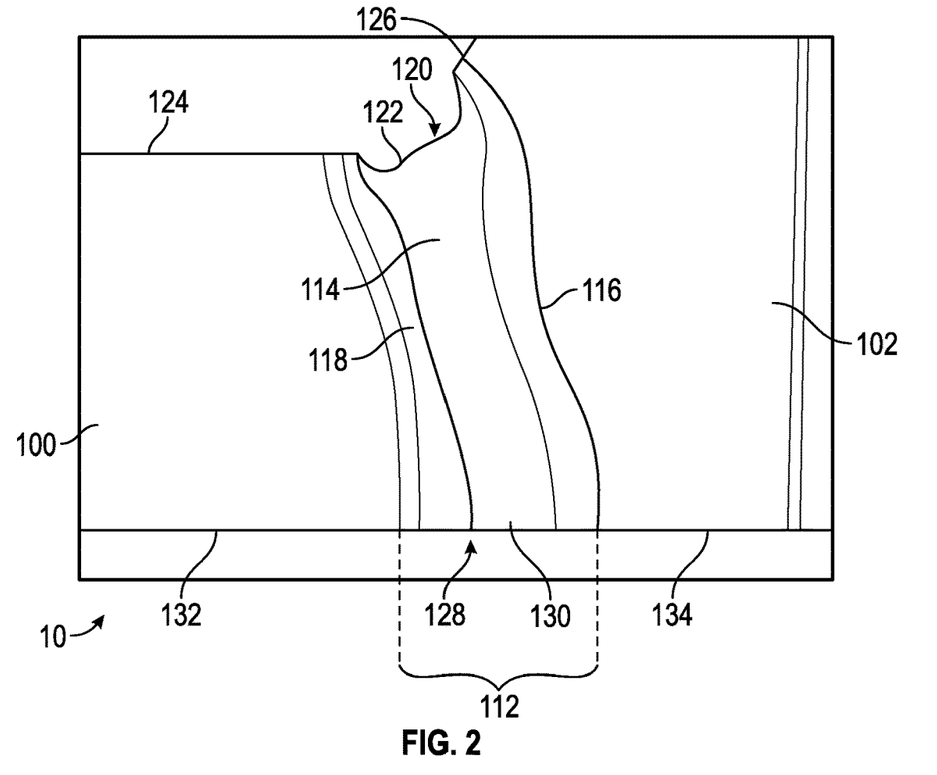
FIG. 2 is a cross-section of a laser welded part illustrated in FIG. 1b, illustrating a cross-section of the weld, taken perpendicular to the weld direction, according to an exemplary embodiment.

After laser welding, a junction 112 is formed by a weld 114 between the first component 100 and second component 102 forming the fused part 10, an aspect of which is illustrated in FIG. 2. The weld 114 includes material from the faying surfaces 106, 108 of the first component 100 and the second component 102 that has melted together and solidified upon cooling. The composition of the weld 114 is affected by the alloy composition of the first component 100 and the second component 102. Heat affected zones 116, 118 are illustrated on either side of the weld 114. At a first end 120, the weld 114 includes a weld surface 122, formed at the junction 112 between a first front surface 124 of the first component 100 and a second front surface 126 of the second component 102, wherein the front surfaces 124, 126 are surfaces which face the welding laser. In additional aspects, the laser of the laser welder is incident upon at least one, if not all, of the front surfaces, depending on the type of junction being formed. At a second end 128, the weld 114 includes a weld root 130, formed at the junction 112 between the first back surface 132 of the first component 100 and the second back surface 134 of the second component 102. The back surfaces 132, 134 of the components 100, 102 oppose the front surfaces 124, 126.

Figure 4:
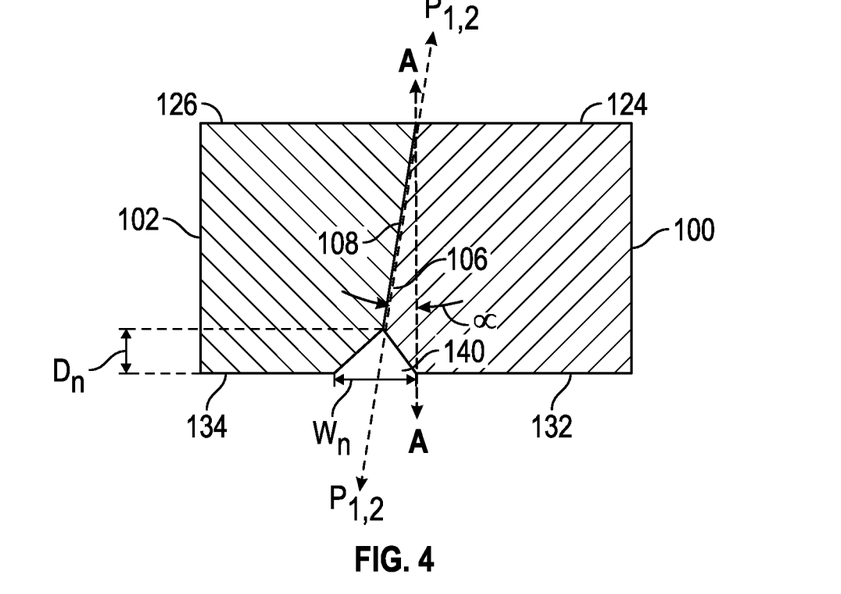
FIG. 4 illustrates a cross-section of two components prior to welding, taken perpendicular to the weld direction, according to an exemplary embodiment.

With reference again to FIG. 1b, in additional aspects of the above, a notch 140 is defined by the first back surface 132 and first faying surface 106 of the first component 100 prior to welding. As illustrated in FIG. 4, the notch 140 may also be defined by the second back surface 134 and the second faying surface 108 of the second component 102. In aspects, the notch 140 width Wn is in the range of 0.5 mm to 1.5 mm, including all values and ranges therein and the notch depth Dn is in the range of 0.5 to 1.0 mm, including all values and ranges therein. Without being bound to a particular theory, the notch 140 is understood to assist increasing surface tension and the formation of a relatively smooth weld root 130 surface.

In further aspects of the above, the first component 100 and second component 102 are formed from iron alloys. In further aspects, the first component 100 and second component 102 are formed from different iron alloys or, alternatively, from the same iron alloy. Ferrous alloys include, e.g., alloy steel, high alloy steel, carbon steel or stainless steel. Alloy steel is an alloy of iron and carbon with one or more of additional alloying elements such as manganese, chromium, silicon, molybdenum, vanadium, copper, nickel, boron, sulfur, titanium, tungsten or other alloying elements, wherein the additional alloying elements and carbon are present in the range of (for steel, 0.02 to 1.2%) by weight of the total alloy composition. Low alloy steels are understood to include less than 5.0% by weight of additional alloying elements and high alloy steel is understood herein to include at least 5.0% by weight of the total alloying elements. Carbon steel has fewer alloying elements, generally carbon, manganese, and silicon. Low carbon steels are understood to include carbon at less than 0.25% by weight of the total alloy weight; whereas high carbon steel is understood to include carbon in the range of 0.59% by weight or more, such as 0.65% by weight, of the total alloy weight. In aspects of the above, the first component 100 is formed from carbon steel, and the second component 102 is formed from alloy steel. In additional aspects, either the first component 100 or the second component 102 is carburized and, in aspects, the first component 100 is carburized.

Generally, increasing amounts of carbon in an iron alloy increases the hardenability of the alloy and decreases the weldability. Hardenability is generally understood as the depth of hardening on quenching, and hardness is generally understood as the resistance to indentation. Hardenability is understood as being dependent on the alloy, the amount of carbon, the microstructure and grain size of the alloy, the geometry of the sample, the type of coolant, austenitizing temperature and time.

When other elements are added to the alloys, the additional elements may also affect the hardenability and weldability of the alloys. The carbon equivalent is used as an indicator to predict the hardenability and weldability of such alloys. The higher the carbon equivalent of an alloy, the higher the hardenability and the lower the weldability. Relatively higher concentrations of carbon, manganese, chromium, silicon, molybdenum, vanadium, boron, copper and nickel tend to increase the carbon equivalent. In aspects, carbon equivalent of a known alloy composition is estimated from the Dearden and O'Neill formula as adopted by the International Institute of Welding. In aspects, the carbon equivalent of the first component is relatively less than the carbon equivalent of the second component.

The hardenability of the alloys may also be characterized by an ideal diameter (DI). The ideal diameter refers to the largest diameter of a steel bar, having a circular cross-section, that, after heat treating to achieve austenitization, can be quenched in an ideal quenchant (water or oil at room temperature) to produce 50% martensite in the center of the bar. The larger the ideal diameter, the higher the hardenability of the iron alloy. It is to be appreciated that the hardenability of non-cylindrical shapes can be estimated using ideal diameter values for equivalent rounds. In aspects, the first component is formed from an alloy that exhibits a relatively smaller ideal diameter than the ideal diameter of the second component.

Figure 3:
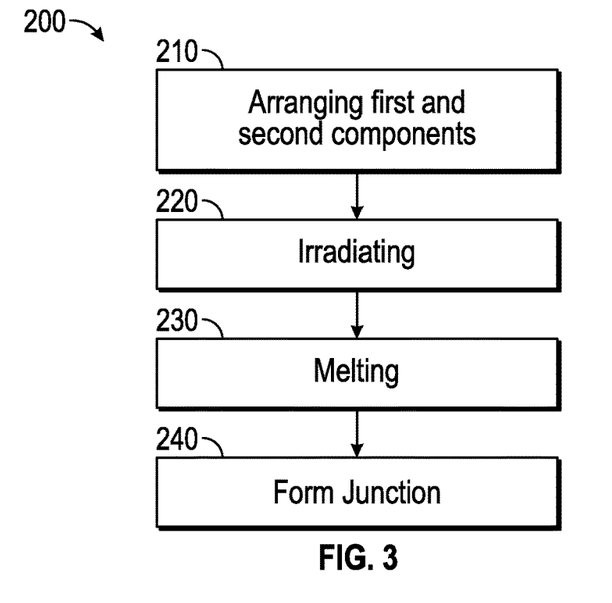
FIG. 3 illustrates a method of laser welding components to form a part, according to an exemplary embodiment.

The present disclosure also relates to a method of laser welding to form the weld 114 at the junction 112 between the first component 100 and the second component 102. An aspect of the method 200 is illustrated in FIG. 3. The method begins at block 210 with arranging the first component 100 and the second component 102 adjacent to each other to provide an interface 110 between the faying surfaces 106, 108. At block 220, the first component 100 and second component 102 are laser welded together by irradiating at least one of a) the first component 100 and the second component 102, at or near the interface 110 of the faying surfaces 106, 108. At block 230, the faying surfaces 106, 108 melt and at block 240 a weld 114 is formed from the melt defining a junction 112 between the first component 100 and the second component 102 to form a part 10.

As described above, the faying surfaces 106, 108 are arranged adjacent to each other to form an interface 110 between the two components 100, 102 prior to welding at block 210. In aspects, the faying surfaces 106, 108 are arranged to contact each other at the interface 110. As illustrated in FIG. 4, the first faying surface 106 defines a first plane P1. It is to be appreciated, however, that the entire faying surface 106 is not, in all aspects, contiguous with the first plane P1, as illustrated by the notch 140 described further herein. The first plane P1 is formed at an angle alpha in the range of +5 degrees to +60 degrees or −5 degrees to −60 degrees (i.e., +/−5 degrees to 60 degrees) from an axis A, which axis A is perpendicular to the first front surface 124. If the first component 100 is circular, as illustrated in FIG. 1, angle alpha also deviates from a center axis AG of the component 100 in the range of +5 degrees to +60 degrees or −5 degrees to −60 degrees, including all values and ranges therein. The second faying surface 108 defines a second plane P2, which is formed at an angle that matches the angle alpha of the first faying surface 106. As illustrated, the first plane P1 overlaps and is parallel to the second plane P2.

Once the faying surfaces 106, 108 of the components are arranged adjacently, the first component 100 and second component 102 are laser welded together at block 220. Laser welding is understood herein as a process of welding that uses a laser to apply energy, in the form of light and heat, to the first component 100 and second component 102. As alluded to above, and illustrated in FIG. 5, the laser 142 is incident on and irradiates at least one of a) the first front surface 124 of the first component 100 and b) the second front surface 126 of the second component 102. Depending on the type of junction 112 formed and the spot size D1 of the laser 142, the laser 142 may be incident on both the first front surface 124 and the second front surface 126.

In aspects, the laser 142 is operated at an electromagnetic wavelength in the range of 532 nanometer to 1070 nanometer, including all values and ranges therein, such as 532 nanometers to 750 nanometers, 750 nanometers to 1070 nanometers, 1070 nanometers, etc. In further aspects, the laser 142 operates at continuous power; however, the laser 142 may also operate at pulsed power. In further aspects of the above, the laser 142 is also operated at a weld speed in the range of 1.00 meters per minute to 3.00 meters per minute, including all values and ranges therein such as 1.45 meters per minute to 1.55 meters per minute, 1.5 meters per minute. Further, in aspects of the above, the laser operates at a power in the range of 2 kW to 6 kW, including all values and ranges therein, such as 3.8 kW to 4.2 kW, 4.0 kW. The power of the laser depends on factors such as weld depth, wherein the deeper the weld 114, the greater the relative power of the laser 142. The laser 142 is operated at a spot size, diameter D1, defined where the laser is incident on at least one of a) the first front surface 124 and b) the second front surface 126, in the range of 200 micrometers to 600 micrometers, including all values and ranges therein, such as 375 micrometers to 425 micrometers, 400 micrometers. The combination of the power and spot size are understood to assist in preventing blow out of the weld 114 at the weld root 130 even though, in aspects, only a single weld 114 is used at the junction 112 to secure the first component 100 and the second component 102.

Figure 5:
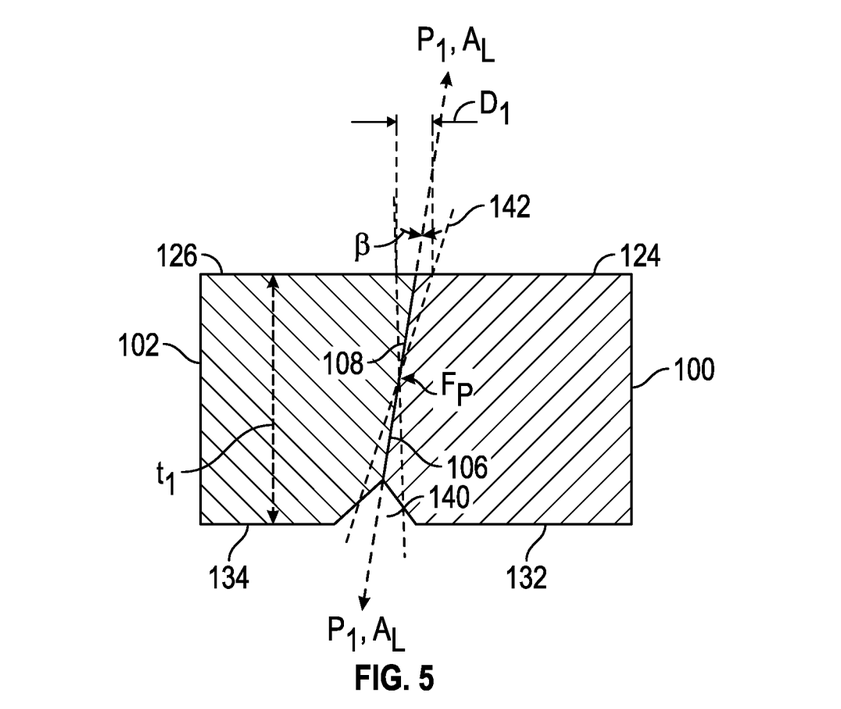
FIG. 5 illustrates a cross-section of two components prior to welding, taken perpendicular to the weld direction, according to an exemplary embodiment.

In further aspects of the above, the laser focal point Fp is focused below the first front surface 124, between the first front surface 124 and the first back surface 132, at a depth of 35 to 65 percent of the respective component thickness t1, including all values and ranges therein, such as 50 percent of the thickness t1. The thickness t1 is measured perpendicular to the first front surface 124 as illustrated in FIG. 5. In alternative aspects, thickness t1 is measured, in a similar manner, relative to the second front surface 126 and second back surface 134. In one aspect of the above, the thickness t1 of the first component 100 and the depth of the weld 114 is in the range of 5.0 mm to 6.5 mm, including all values and ranges therein, such as 5.5 mm. The focal point Fp is understood to contribute to the shape of the weld 114 as characterized further herein. In addition, the laser ramp in, in the welding direction, is in the range of 2 to 15 degrees, including all values and ranges therein, and the laser ramp out, in the direction of welding, is in the range of 2 to 15 degrees, including all values and ranges therein.

Figure 6A:
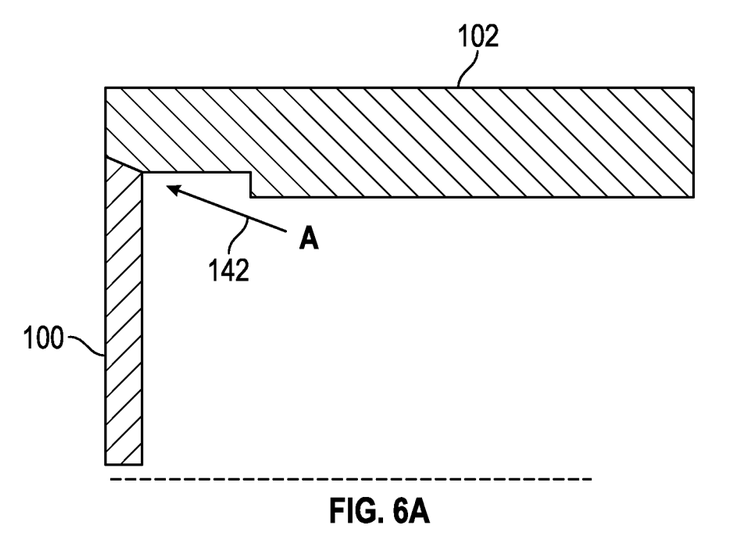
FIG. 6a illustrates a cross-section of components to be laser welded and the laser beam direction relative to the components, taken perpendicular to the weld direction, illustrating a tilt angle of the laser welding axis, according to an exemplary embodiment.
Figure 6B:
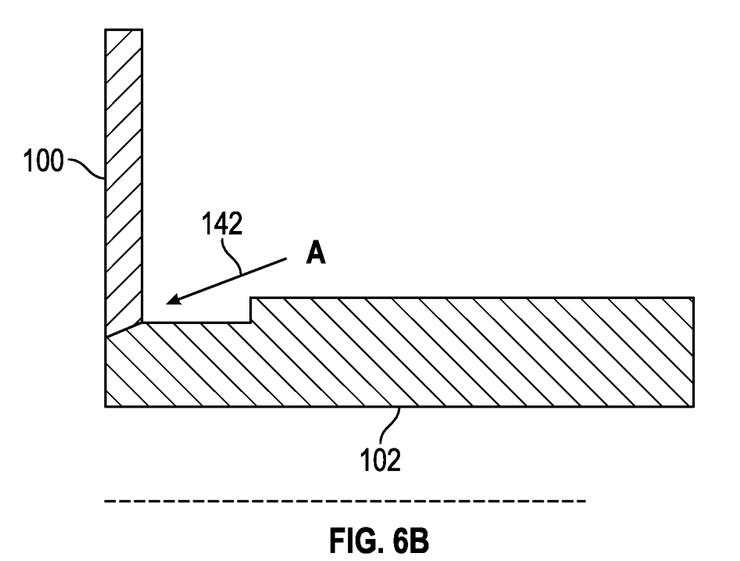
FIG. 6b illustrates a cross-section of components to be laser welded and the laser beam direction relative to the components, taken perpendicular to the weld direction, according to an exemplary embodiment.

FIGS. 6a through 6b illustrate the general angle and direction the center axis A1 of the laser 142 (represented by the arrow heads) is tilted relative to a first component 100 and a second component 102. FIG. 6a illustrates an aspect where the first component 100 is a flange formed from carbon steel and the second component 102 is an internal gear formed from alloy steel, such as high alloy steel. FIG. 6b illustrates an aspect where the first component 100 is a hub formed of carbon steel and the second component 102 is an external gear formed from alloy steel, such as high alloy steel. In these aspects, the laser 142 is angled towards the carbon steel component.

Figure 7:
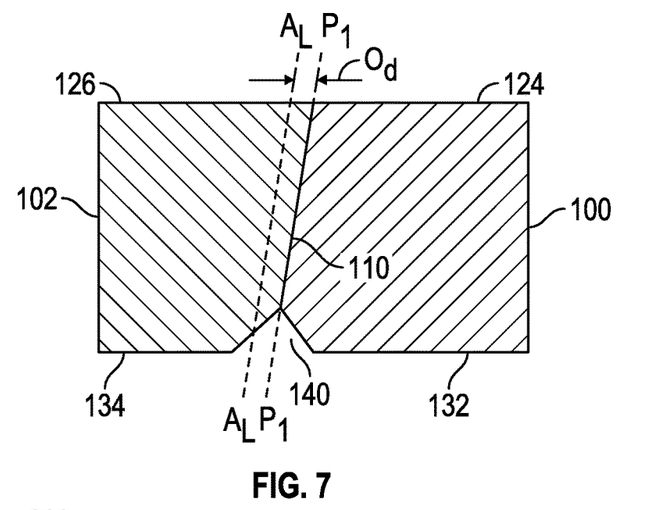
FIG. 7 illustrates a cross-section of two components prior to welding, taken perpendicular to the weld direction, illustrating an offset of the welding laser axis from the faying surfaces, according to an exemplary embodiment.

With reference again to FIG. 5, in aspects, the laser 142, as determined by the center axis of the laser A1, is positioned at an incident angle beta, which deviates from the first plane P1 defined by the first faying surface 106, in the range of 0 to +/−5 degrees, including all values and ranges therein, such in the range of +1-0.1 degrees to +/−5 degrees, 0 degrees, etc. The angle of incidence is generally understood as the angle between the laser (as defined by the center axis) incident on a surface and the line perpendicular to the surface at the point of incidence. In aspects, the incident angle beta of the laser 142 is toward the second component 102. In further aspects, the incident angle of the laser 142, as defined by the center axis A1, is tilted 5 to 60 degrees toward the component having a higher ideal diameter from an axis perpendicular to that component surface, including all values and ranges therein, such as 5 to 35 degrees. Further, as illustrated in FIG. 7, the center axis A1 of the laser 142 may be offset from the plane P1 at distance Od in the range of 0.05 mm to 0.8 mm. In aspects, the offset is in the direction towards the component having a relatively higher ideal diameter than the ideal diameter other component. In further aspects, the offset is in the direction of the first component 100.

Upon irradiation at block 220, a portion of the first faying surface 106 of the first component 100 and the second faying surface 108 of the second component 102 melt at block 230. It is to be appreciated that in adjusting the laser tilt relative to the faying surfaces 106, 108 of the welding laser 142, the amount of material of the faying surfaces 106, 108 that is melted may be varied, affecting the alloy composition of the weld 114. It is also contemplated that adjusting the focal point Fp depth may alter melt chemistry if the laser tilt angle beta is deviates from the first faying surface 106 plane P1. Adjusting the alloy composition of the weld 114 affects the carbon equivalent and the ideal diameter of the weld 114, which may then be used to optimize the mechanical, electrical or thermal properties of the weld 114. The molten material then cools to form the weld 114 and a junction 112 between the first component 100 and the second component 102 at block 240.

Figure 8:
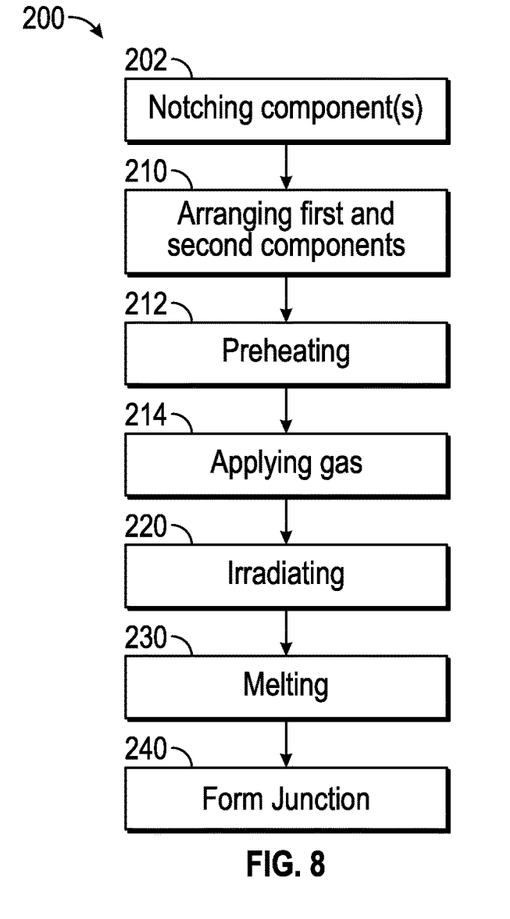
FIG. 8 illustrates a method of laser welding components to form a part including optional process steps, according to an exemplary embodiment.

In optional aspects, illustrated in FIG. 8, the method begins with forming a notch 140 at block 202. In addition, after arranging the first component 100 and the second component 102 at block 212, the first back surface 132 of the first component 100 and the second back surface 134 of the second component 102 are optionally preheated at a temperature in the range of 100° C. to 180° C., including all values and ranges therein. In aspects, the back surfaces 132, 134 are heated to a temperature in the range of 100° C. to 180° C., including all values and ranges therein. Preheating is, in aspects, performed locally and proximal to the interface 110, wherein the preheating zone may extend in the range of 0.2 millimeters to 2.0 millimeters from either side of the interface 110, including all values and ranges therein. In further aspects, heating is performed by induction heating or using a defocused laser beam, wherein the operating parameters of the laser are outside of the ranges noted herein.

At block 214, gas is optionally applied to the first back surface 132 and the second back surface 134 of the components 100, 102. In aspects, the gas is an inert gas, such as argon or nitrogen, and is supplied at a rate in the range of 0.1 standard cubic centimeters per minute (sccm) to 10 sccm, including all values and ranges therein. In further aspects, the application of gas is maintained after the first component 100 and the second component 102 are irradiated and, in some aspects, until the weld 114 has solidified. In aspects, applying gas to the back surfaces 132, 134 of the components 100, 102 helps protect the molten material and provide a relatively smooth weld root 130 that does not collapse.

Figure 9:
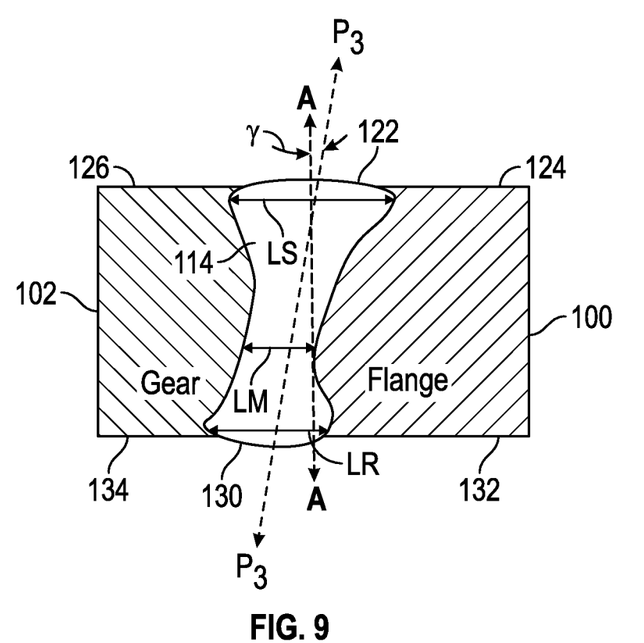
FIG. 9 illustrates a cross-section of two components post laser welding, taken perpendicular to the weld direction, illustrating the hourglass cross-section of the weld, according to an exemplary embodiment.

As illustrated in FIG. 9, the weld 114 fuses the first component 100 and second component 102 at the junction 112. In aspects, the center 150 of the weld 114 defines a plane P3 that is at an angle gamma, in the range of +5 degrees to +60 degrees or, alternatively in the range of −5 degrees to −60 degrees (i.e., +/−5 degrees to 60 degrees), from an axis A perpendicular to a first front surface 124 of the first component 100. In addition, the weld 114 formed by the process described above takes on the shape of an hourglass as illustrated in FIGS. 2 and 8. As illustrated in these figures, the weld 114 includes a weld surface 122 between the first front surface 124 and the second front surface 126, a weld root between the first back surface 132 and the second back surface 134 and a middle portion 136 located between the weld surface 122 and the weld root 130 at about 35 percent to 65 percent of the depth of the first component 100 (or second component 102) thickness t1. In aspects the hourglass shaped weld exhibits a weld surface 122 length LS to midpoint length LM ratio in the range of 1:1 to 2.0:1 including all values and ranges therein, such as 1.25:1, and a weld root length LR to weld midpoint length LM ratio in the range of 1:1 to 2.0:1, including all values and ranges therein. The middle portion 136 exhibits a length that is less than the thickness of both the weld surface 122 and the weld root 130 due, at least in part, to the positioning of the laser 142 focal point Fp. As the middle portion 136 of the weld 114 is generally shorter than the remaining portions of the weld 114, the heat affected zones 116, 118 are relatively smaller. In aspects, only a single weld 114 is needed and provided at the junction 112.

While the method and weld 114 is described above regarding the first component 100 and the second component 102, it is to be appreciated that the method is applicable to fusing additional components, such as a third component to the part. With reference again to FIG. 1, the part 10 is a transmission gear for use in a motor vehicle. It is to be appreciated, however, that the method and welds produced thereby are applicable to other components and parts such as clutch hub assembly, clutch housing assembly, prop shaft assembly, half shaft assembly, rear axle, and gears and housings for wind power generation and electric appliances, and are not limited to transmission gears for motor vehicles.

The method of forming a single, angled and hourglass shaped weld and components formed by the method of the present disclosure offer several advantages. These advantages may include, for example, an increase in welding assembly precision. These advantages further include provision of a relatively smooth finish surface at the root of the weld. These advantages yet further include a reduction of heat affected area cooling cycles, which reduces or avoids cracking. These advantages yet even further include a larger faying surface area providing for increased weld strength and relatively improved loading conditions. These advantages also include the ability to alter fusion carbon equivalent with the ability to tilt the laser beam.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of welding components, comprising:
    arranging a first faying surface of a first component and a second faying surface of a second component adjacently to define an interface between the first component and the second component, wherein the first component includes a first front surface and a first back surface opposing the first front surface, and the second component includes a second front surface and a second back surface opposing the second front surface;
    preheating the interface at the first back surface and the second back surface at a temperature in the range of 100° C. to 180° C.;
    irradiating at least one of a) the first front surface of the first component and b) the second front surface of the second component at the interface with a laser, wherein the first faying surface defines a plane formed at an angle alpha from an axis A perpendicular to the first front surface and the second faying surface matches the first faying surface, wherein angle alpha is in one of the following ranges: +5 degrees to +60 degrees and −5 degrees to −60 degrees;
    melting the first faying surface and second faying surface and forming a melt pool at the interface; and
    forming a junction at the interface with an hourglass shaped weld.

2. The method of claim 1, wherein the laser defines a center axis and the center axis of the laser deviates from the plane defined by the first faying surface at an angle beta in the range of +/−0.1 degrees to 5 degrees.

3. The method of claim 1, further comprising adjusting a carbon equivalent of the hourglass shaped weld by adjusting an incident angle of the laser as defined by a center axis of the laser.

4. The method of claim 1, wherein the first component exhibits a first diameter and the second component exhibits a second diameter, wherein the first diameter is smaller than the second diameter.

5. The method of claim 4, wherein a center axis defined by the laser is tilted at an angle in the range of 5 to 35 degrees from the axis perpendicular to the first component.

6. The method of claim 1, further comprising focusing the laser at a focal point between the first front surface and the first back surface at a distance in the range of 35 percent to 65 percent of a thickness of the first component, wherein the thickness is measured perpendicular to the first front surface.

7. The method of claim 1, further comprising operating the laser at a spot size in the range of 200 to 600 micrometers.

8. The method of claim 1, wherein the laser further defines a center axis and the method further comprises offsetting the center axis from the interface and towards the first component at a distance in the range of 0.05 mm to 0.8 mm.

9. The method of claim 1, further comprising operating the laser at a power in the range of 2 kW to 6 kW.

10. The method of claim 1, further comprising operating the laser at a weld speed in the range of 1.00 meters per minute to 3.00 meters per minute.

11. The method of claim 1, further comprising preheating by at least one of the following: induction heating and heating with a defocused laser.

12. The method of claim 1, further comprising defining a notch in at least one of the a) first back surface and the first faying surface and b) the second back surface and the second faying surface and a portion of the melt pool flows into the notch.

13. The method of claim 1, further comprising applying an inert gas at the interface of the first back surface and the second back surface.

14. The method of claim 1, further comprising forming only one hourglass shaped weld at the junction.

15. The method of claim 1, forming the hourglass shaped weld to exhibit a weld surface length to weld midpoint length ratio in the range of 1:1 to 2.0:1.

16. The method of claim 1, forming the hourglass shaped weld to exhibit a weld root length to weld midpoint length ratio in the range of 1:1 to 2.0:1.

17. The method of claim 1, wherein the first component is a circular gear and defines a center axis and the angle alpha of the plane deviates +/−10 degrees to 30 degrees from the center axis.

18. A method of welding components, comprising:
    arranging a first faying surface of a first component and a second faying surface of a second component adjacently to define an interface between the first component and the second component, wherein the first component includes a first front surface and a first back surface opposing the first front surface, and the second component includes a second front surface and a second back surface opposing the second front surface;
    preheating the interface at the first back surface and the second back surface at a temperature in the range of 100° C. to 180° C. and preheating by at least one of the following: induction heating and heating with a defocused laser;
    irradiating at least one of a) the first front surface of the first component and b) the second front surface of the second component at the interface with a laser, wherein the first faying surface defines a plane formed at an angle alpha from an axis A perpendicular to the first front surface and the second faying surface matches the first faying surface, wherein angle alpha is in one of the following ranges: +5 degrees to +60 degrees and −5 degrees to −60 degrees;
    melting the first faying surface and second faying surface and forming a melt pool at the interface; and
    forming a junction at the interface with an hourglass shaped weld.

19. The method of claim 18, wherein the laser defines a center axis and the center axis of the laser deviates from the plane defined by the first faying surface at an angle beta in the range of +/−0.1 degrees to 5 degrees.

20. The method of claim 18, further comprising focusing the laser at a focal point between the first front surface and the first back surface at a distance in the range of 35 percent to 65 percent of a thickness of the first component, wherein the thickness is measured perpendicular to the first front surface.

* * * * *